(12) United States Patent
Savagaonkar

(10) Patent No.: US 7,768,911 B2
(45) Date of Patent: *Aug. 3, 2010

(54) PLATFORM-BASED METHOD AND APPARATUS FOR CONTAINING WORMS USING MULTI-TIMESCALE HEURISTICS

(75) Inventor: Uday Savagaonkar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 864 days.

This patent is subject to a terminal disclaimer.

(21) Appl. No.: 11/393,097

(22) Filed: Mar. 29, 2006

(65) Prior Publication Data

US 2007/0237080 A1    Oct. 11, 2007

(51) Int. Cl.
*G01R 31/08*    (2006.01)
*G06F 15/16*    (2006.01)

(52) U.S. Cl. .................. 370/230; 370/235; 370/253; 726/13; 726/14

(58) Field of Classification Search .................. 370/235, 370/229; 726/25, 22
See application file for complete search history.

(56) References Cited

U.S. PATENT DOCUMENTS

| | | | |
|---|---|---|---|
| 7,050,931 B2 * | 5/2006 | Conrad | 702/177 |
| 7,320,142 B1 * | 1/2008 | Kasper et al. | 726/22 |
| 2003/0084326 A1 * | 5/2003 | Tarquini | 713/200 |
| 2004/0098617 A1 * | 5/2004 | Sekar | 713/201 |
| 2004/0215976 A1 * | 10/2004 | Jain | 713/201 |
| 2006/0095970 A1 * | 5/2006 | Rajagopal et al. | 726/25 |

* cited by examiner

*Primary Examiner*—Seema S Rao
*Assistant Examiner*—Christine Duong
(74) *Attorney, Agent, or Firm*—Blakely, Sokoloff, Taylor & Zafman LLP

(57) ABSTRACT

A processing unit analyzes network traffic using a multi-timescale heuristic having multiple traffic windows. Each traffic window has a respective threshold value and a respective timescale. When a threshold value is exceeded, the processing unit triggers a network circuit breaker, causing a host platform to be isolated from the network.

20 Claims, 3 Drawing Sheets

PLATFORM-BASED METHOD AND APPARATUS FOR CONTAINING WORMS USING MULTI-TIMESCALE HEURISTICS

FIELD

Embodiments of the invention relate to security of computing devices, and more particularly to network security and worm containment.

BACKGROUND

Internet worms present a serious threat to today's highly networked computing environment. Unlike viruses and Trojans, worms typically spread automatically without active human intervention, resulting in infection rates that are considerably higher than those of conventional viruses. For example, analysis determined the Slammer worm attained probe rates of as high as 26,000 scans per second. Additionally, the Witty worm outbreak demonstrated the insufficiency of patching techniques, given the worm appeared only one day after publication of the corresponding vulnerability.

Modeling worm-spread is closely related with worm-containment, as worm-spread models allow for the evaluation of the effectiveness of a worm-containment strategy. To this point, proposed models include differential equation models as well as Markov models. Barring some disagreements regarding networks that demonstrate localized interactions, researchers agree that worms spread at exponential rates after initial infection. This exponential spread-pattern allows the network administrators extremely short reaction time to take any countermeasures.

The need for fast response times emphasizes the need for an automated mechanism to locally detect and control the spread of a worm. Traditionally, network administrators have used host-based firewalls and various intrusion-detection systems for this purpose. Such systems attempt to prevent infection by scanning for worm signatures in network traffic. In addition, these firewalls prevent vulnerable services from being exposed to the network. Although these measures are effective against known worms, they are not effective against day-zero worm outbreaks. Moreover, most of these firewalls and intrusion-detection systems are software based, and are thus vulnerable to tampering and exploitation by worms themselves. An example of this vulnerability is the Witty worm that infected a host intrusion detection software package.

Worms typically spread by exploiting some software vulnerability in the target system. Numerous worms have exploited different types of buffer overflow vulnerabilities, including, for example, the Morris, Code Red I, and Code Red II worms. In response, researchers have proposed proactive mechanisms, such as using robust-programming practices and generating automated tools that generate robust code. However, these techniques require the existing software to be recompiled and/or rewritten. Also, such approaches mandate replacing entire software suites on the network, as any piece of software could expose a vulnerability. Moreover, such mechanisms may result in performance degradation.

Self-propagating worms spread by locating vulnerable hosts on the network and compromising a vulnerable services running on those hosts. A typical mechanism used by worms for this purpose is called random address scan, where a worm randomly generates Internet Protocol (IP) addresses, and attempts to compromise vulnerable services on the hosts with those IP addresses. For example, the Code Red and the Slammer worms used random address scan to find vulnerable machines on the network. Other methods of scan can be used, including serial scan (where a worm scans IP addresses in a serial fashion), local preference scan (where a worm generates local IP addresses with higher probability of validity), and divide-and-conquer scan (where a worm splits the range of IP addresses to scan when it propagates to a new computer). Examples of worms using these other scanning techniques include the Code Red II worm (local preference scan) and the Blaster worm (serial scan). Worm-containment systems leverage this scanning behavior to detect infected hosts and then mitigate the threat, either by throttling traffic from the infected host or by quarantining the infected host entirely. However, these systems are potentially vulnerable to tampering and/or exploitation by worms. For example, it is possible to bypass a connection throttling mechanism implemented in the operating system (OS) by sending out raw Ethernet frames onto the network.

Another problem with current worm-containment systems is that they are not capable of containing both fast and slow-spreading worms simultaneously.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

Figure 1:
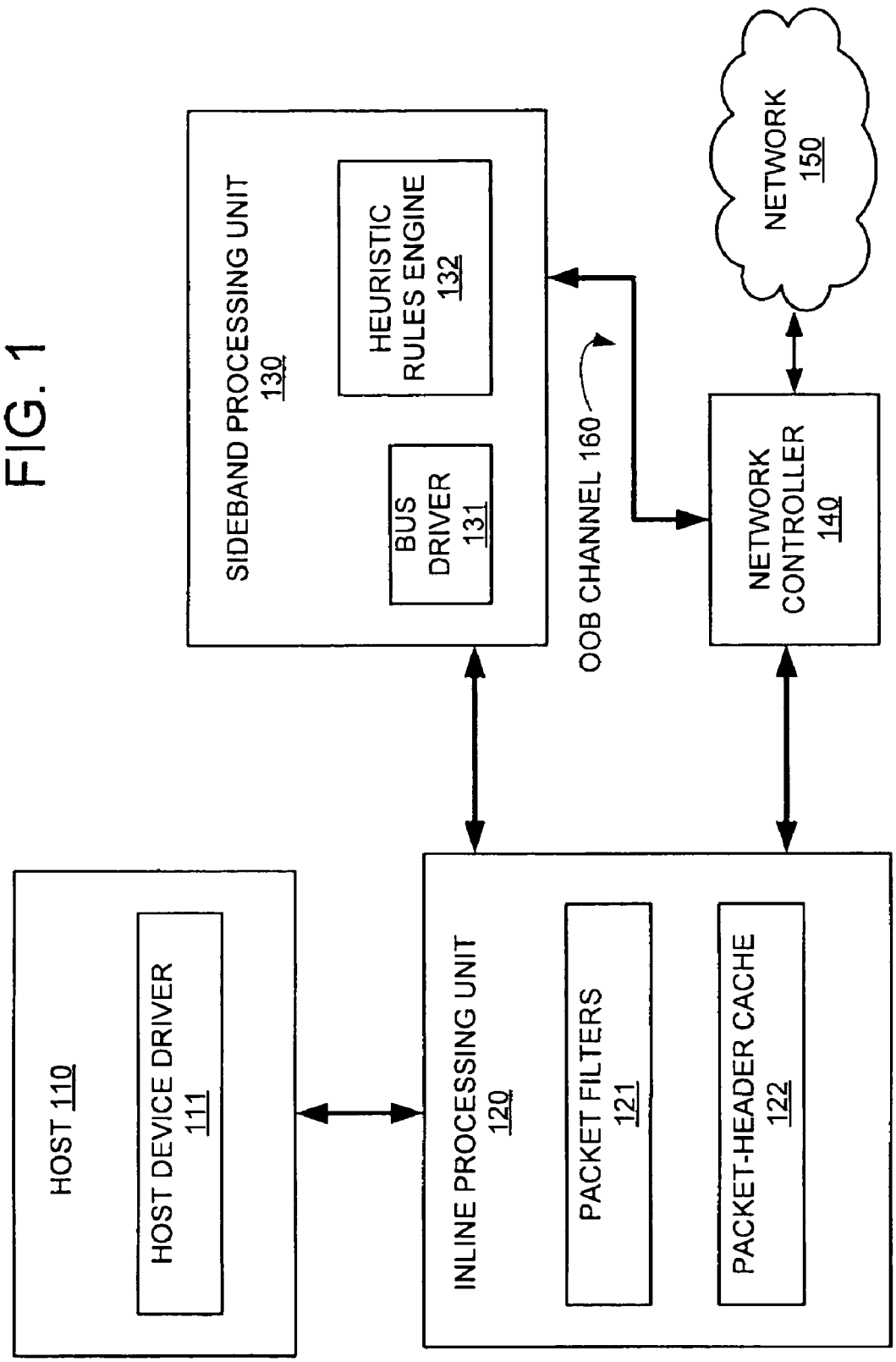
FIG. 1 is a block diagram illustrating an embodiment of the invention.

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

The invention described herein is a platform-based, OS-independent worm-containment system. The system continuously observes outgoing network connections from a host system (or "host") over a finite-duration traffic window and determines, using heuristic rules, if the host is infected. For infected hosts, the system automatically isolates/quarantines the host from the rest of the network to stop further spread of the worm into the network.

In one embodiment, an autonomous hardware and/or software agent may continuously monitor the behavior of the host and network traffic to determine whether the operation is within a normal operating profile (also referred to as "in-profile" operation). To address the different characteristics of different hosts and the possibility of ever changing network attack, new algorithms (e.g., heuristic analysis algorithms)

may be downloaded to the monitoring agent to determine what host system characteristics are in-profile and what host system characteristics are out-of-profile.

If the characteristics are determined to be out-of-profile, a network circuit breaker may be tripped, causing the host to be isolated/quarantined from the network. An out-of-profile determination may be the result of network traffic conditions, security evaluations, risk assessment and/or other factors. In one embodiment, to trip the network circuit breaker, the monitoring agent may locally execute a pre-specified instruction sequence that may result in one or more actions including, for example, resetting the host system, notifying network administration, dropping or throttling or redirecting network traffic, restoring the host system, disabling one or more network interfaces and/or disabling one or more devices coupled with a host system bus.

As used herein, the terms "isolation" and "quarantine" refer to total isolation from the network, isolation from the network during which the host system maintains an out-of-band (OOB) communications channel, as well as throttling of the network connection. Isolation with the OOB channel allows for remote administration/management during the isolation period. Throttling of the network connection may slow the spread of unusual traffic until diagnostic action is taken. Other actions that may be taken in response to detecting infected hosts may further include switching network traffic on a virtual local area network (VLAN) allocated to be a remediation network, or alerting remote administrators that a problem was discovered.

Multiple mechanisms can be used to support self-isolating functionality. In one embodiment, an embedded agent within a system executes management functions that disable communications except for an out-of-band management communications channel that can be used for repair and/or restoration purposes. In one embodiment, the embedded agent operates independently of the operating system so that the self-isolation functionality is available whether or not the operating system is loaded and whether or not the operating system is functional or compromised.

In general, an embedded agent within a network device may operate to disable or remove one or more communications devices or other system components in response to a determination that the network device is potentially harmful. In one embodiment, the embedded agent may use configuration bits written to a configuration register for one or more communications interfaces to cause the network device to determine that the communications interfaces are no longer functioning. The embedded agent may also filter traffic to or from specific applications, protocol types, or remote addresses and can be configured to take actions against a specified subset of traffic.

A "traffic window," as used herein, is a fixed period of time during which network traffic-flow is monitored by the system and events are analyzed using one or more heuristic algorithms/rules. The length of the time period defining the traffic window is referred to herein as the "window size" or "timescale." Thus, the window size or timescale defines the point in time at which counters corresponding to respective traffic windows are reset, marking the beginning of the new traffic window(s).

In one embodiment, the heuristic algorithm(s) used to analyze the network traffic includes at least two parameters—a window size and a respective threshold, or threshold "value." Whenever the threshold is crossed, the system reports that it has detected a worm scan. The lower the threshold, the more quickly the network circuit breaker may be tripped. However, if the threshold is too low, then the risk of false-positives becomes a concern. A "false-positive" occurs when the system reports that it has detected a worm scan when the platform is actually not infected. Thus, the threshold should be chosen so as to balance the speed with which a worm is detected against the risk of false-positives. Typically, this would be accomplished by choosing the smallest threshold value that yields a zero false-positives rate.

In one embodiment, a multi-timescale heuristic is used to analyze network traffic. A multi-timescale heuristic incorporates the simultaneous use of multiple traffic windows, each window having a different window size. Smaller window sizes allow the heuristic to detect fast-spreading worms much earlier than larger traffic windows with larger window sizes. Conversely, larger window sizes allow the heuristic to detect worms that spread at a slower rate that may not be detectable by traffic windows with smaller window sizes. Each window may be targeted at a worm with specific spread characteristics. Thus, each window may also have a distinct threshold value.

In one embodiment, the system runs multiple heuristics using the same time window. In another embodiment, the system runs different heuristics at different time windows. In yet another embodiment, the system runs the same heuristics at different time windows. In embodiments where all heuristics run at the same time window, data structures can be shared to save space and increase execution efficiency. Multiple traffic windows may be arranged in the form of a decision tree, and can be invoked sequentially until all windows are exhausted, or a worm scan is detected.

More particular descriptions of certain implementations and embodiments follows in reference to the Figures.

FIG. 1 is a block diagram of an embodiment of the invention. Host 110 represents an electronic system or computing system. For example, host system 110 can be a mobile computing device or mobile computing platform. Mobile computing devices may include laptop computers, handheld computing systems, personal digital assistants (PDAs), smart phones, etc. Host system 110 may also be a desktop computer, a server-type computer, or a workstation. Host 110 includes host device driver 111, which enables applications and/or programs running on the host operating system (OS) to interact with a hardware device, such as a processing unit or a network interface card (NIC). In particular, host device driver 111 allows applications and/or programs running on the host OS to send and receive data over a network.

Host 110 is coupled to an inline processing unit (IPU) 120. IPU 120 includes components that are in the direct path of inbound/outbound network traffic of host 110. The IPU 120 can be implemented within a network interface card (NIC) or it can be a stand-alone processing unit located between the host 110 and any NIC hardware. IPU 120 includes packet filters 121, which operate on Internet Protocol (IP) packet headers, including Transmission Control Protocol (TCP) and User Datagram Protocol (UDP) packet headers, of the host network traffic. The use of packet filters 121 allows IPU 120 to take specific actions, such as dropping packets. IPU 120 also includes a packet-header cache 122, which holds copies of time-stamped packet headers corresponding to the inbound/outbound network traffic of host 120. The packet header copies are deposited into the cache 122 after passing through the packet filters 121.

A sideband processing unit (SPU) 130 is coupled to IPU 120. In one embodiment, SPU 130 is implemented in a tamper-resistant environment, isolated from the host operating environment. To achieve isolation, SPU 130 can be implemented as a dedicated co-processor. For example, SPU 130 can be any type of processor known in the art, for example, a processor from the Pentium® family of processors, the Itanium® family of processors, the Xeon® family of processors, available from Intel Corporation of Santa Clara, Calif. Other processors can also be used.

The SPU 130 is not inline with the network traffic of host 110. In other words, the functions of the SPU 130 have no affect on system throughput between host 110 and a network 150. The components of the SPU 130 are used to analyze network traffic using heuristic rules/algorithms and to manage the configuration of the heuristics, as well as the packet filters 121 in IPU 120.

As shown in FIG. 1, SPU 130 includes a heuristic rules engine 132, which applies various worm containment heuristic rules/algorithms to the packet headers obtained from the packet-header cache 122 of IPU 120. In one embodiment, if heuristic rules engine 132 detects evidence of anomalous traffic, it can install appropriate remedial packet filters into IPU 120. Additionally, heuristic rules engine 132 can send an alert to a remote administrator through an out-of-band (OOB) management channel 160. When SPU 130 detects an infected host, causing the host to be quarantined/isolated from network 150, OOB management channel 160 allows SPU 130 to maintain connectivity with network 150 for repair and/or restoration purposes.

Figure 2:
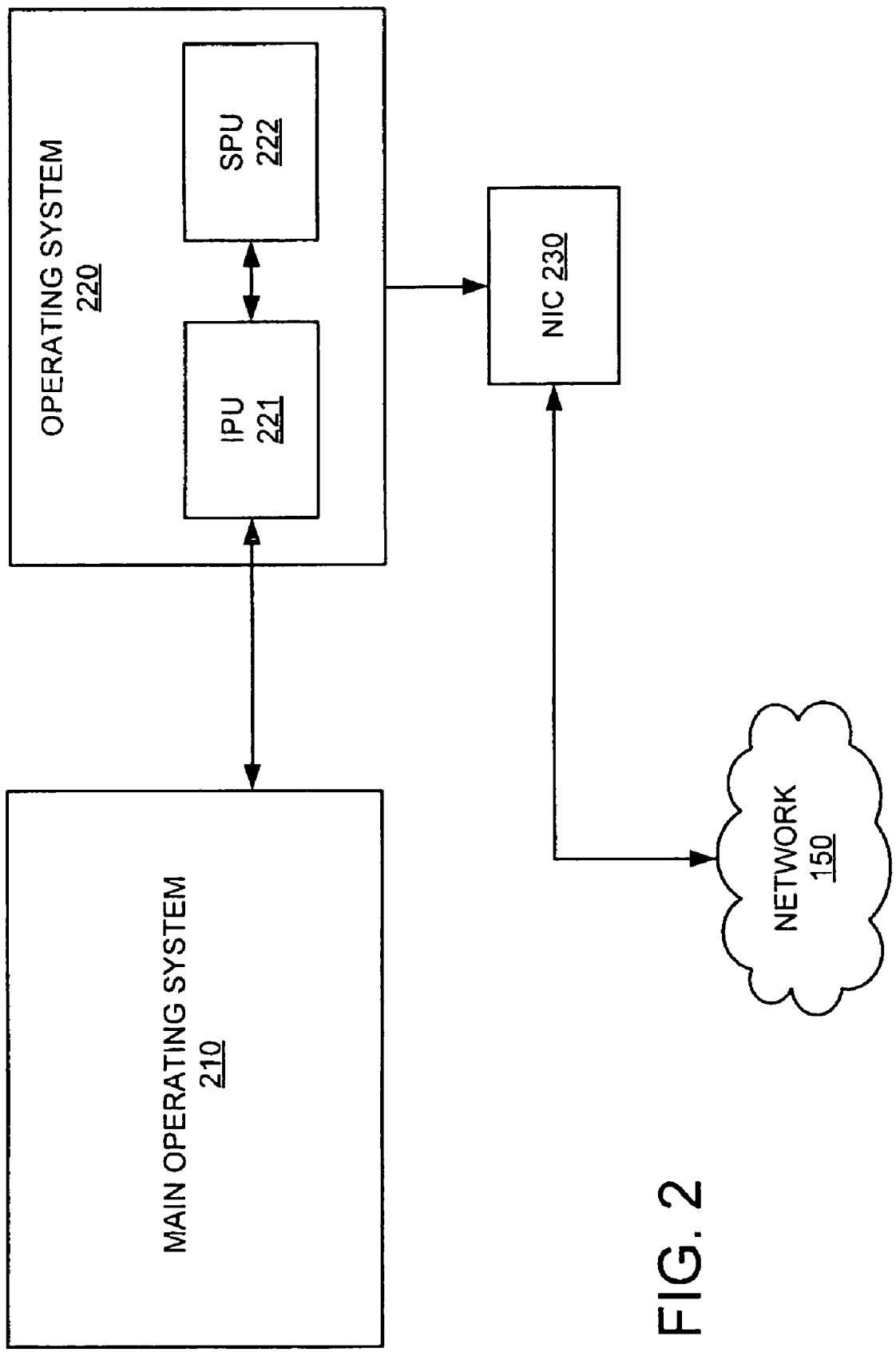
FIG. 2 is a block diagram illustrating another embodiment of the invention.

FIG. 2 illustrates an embodiment where the host is partitioned using virtualization techniques. SPU 222 is implemented in a secure virtual partition that is independent of the main (host) operating system 210. Thus, OS 220, including SPU 222, is isolated from the main OS 210. IPU 221 is logically positioned in the path to stand between the main OS 210 and the network 150 and receives the inbound/outbound network traffic.

Figure 3:
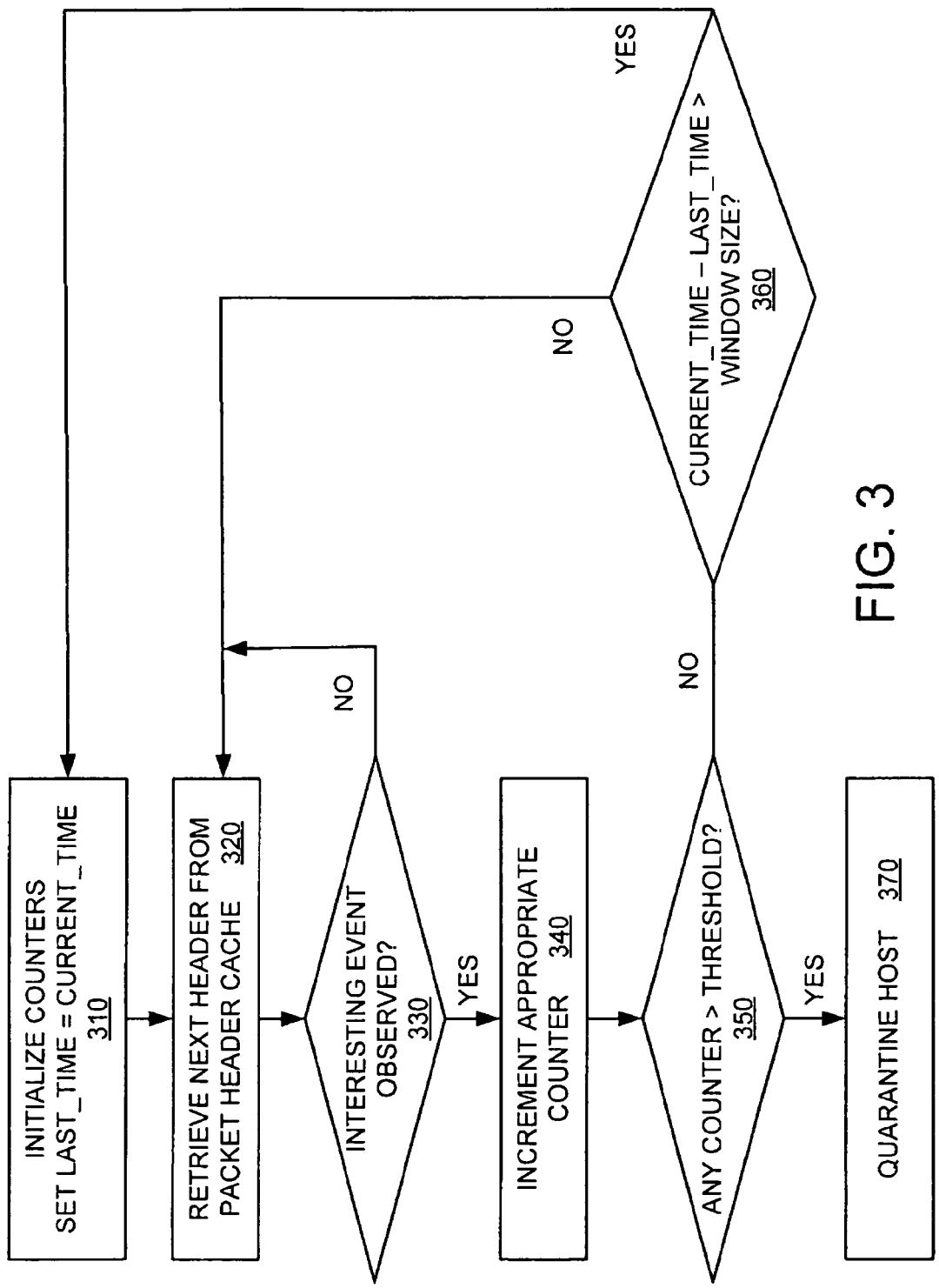
FIG. 3 is a flow diagram illustrating an embodiment of the invention.

FIG. 3 is a flow diagram illustrating multi-timescale heuristics according to an embodiment of the invention. In one example embodiment, the multi-timescale heuristics illustrated in FIG. 3 are implemented by heuristic rules engine 132 of FIG. 1. In other embodiments, the heuristics shown in FIG. 3 can be implemented in software, firmware, or any combination of hardware, software, and/or firmware.

FIG. 3 illustrates a process according to an embodiment of the invention. The process relies on the detection of "interesting events." When the total count of detected interesting events exceeds a pre-determined threshold, an alarm is triggered and the host operating system is quarantined/isolated from the network. Thus, for a given traffic window, the system maintains a corresponding counter. At the beginning of a new traffic window, the corresponding counter is initialized 310. After initialization, the system retrieves the next packet header from the packet cache 320 and determines whether an interesting event has occurred 330. Interesting events are determined by heuristic analysis.

In one embodiment, a packet header containing an indication of a unique network connection is a trigger for an interesting event. A unique connection may be characterized by a unique source port, destination port, and/or destination address for a packet. This heuristic may be referred to as a "new connections" heuristic. In another embodiment, a packet header containing an indication of a unique destination IP address triggers an interesting event. This heuristic is an example of a "pure address-scan" heuristic.

In another embodiment, a modified "pure address-scan" heuristic is used. This heuristic counts unique destination IP addresses grouped by destination port. In other words, the heuristic maintains a separate count of unique destination IP addresses for each destination port. Thus, each count is separately applied against the threshold for the traffic window. This heuristic is referred to as a "port-based address-scan" heuristic.

In yet another embodiment, a heuristic divides all packet headers in the traffic window into TCP and UDP traffic. For the TCP traffic, the heuristic counts the number of unique destination IP addresses appearing in TCP synchronize (SYN) requests. Similar to the "port-based address-scan" heuristic, the unique destination IP addresses are grouped by destination port. For the UDP traffic, the heuristic counts the total number of unique destination IP addresses, grouped by destination port. Again, each count is separately compared against the threshold for the traffic window. This heuristic is called a "port/protocol-based address-scan" heuristic.

Each time an interesting event (as described above) occurs, an appropriate counter is incremented 340. For example, in an embodiment using the port/protocol-based address-scan heuristic on a system having multiple ports, the counter corresponding to a particular port is incremented each time the heuristic detects a unique TCP SYN request on that port. As another example, in an embodiment using the pure address-scan heuristic, the corresponding counter is incremented each time a unique destination IP address is detected.

After a counter is incremented 340, the relevant heuristic determines whether the total count has exceeded the threshold value for the traffic window 350. If the count exceeds the threshold for the traffic window, a network circuit breaker is tripped to quarantine/isolate the host system from the network 370. If the count does not exceed the threshold and the traffic window has not expired 360, then the heuristic retrieves the next packet header from the packet header cache 320. The process of detecting interesting events and incrementing appropriate counters is then repeated. If, however, the traffic window has expired 360 (and the count does not exceed the threshold), then any relevant counters must be reset and initialized 310. Thus, the system is able to automatically detect and contain worms using this heuristic analysis. By using multiple traffic windows simultaneously (where each traffic window has a different window size), the system is able to detect and contain both fast and slow-spreading worms.

The system may include hardware, software, and/or a combination of these. In a case where the system includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.). The machine accessible medium may further include an electronic device having code loaded on a storage that may be executed when the electronic device is in operation. Thus, delivering an electronic device with such code may be understood as providing the article of manufacture with such content described above.

Besides what is described herein, various modifications may be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A computer-implemented method, comprising:
processing, via a processor, network traffic using a multi-timescale heuristic having multiple simultaneous traffic windows, wherein each traffic window has a respective threshold value and a respective timescale defining a period of time for the traffic window after which a counter for the traffic window is reset and wherein at least one traffic window is used to run multiple different heuristics;
wherein the processing includes
counting unique destination IP addresses within a traffic window, and
comparing the number of unique destination IP addresses against the threshold value for the traffic window; and
the processor generating an action if the heuristic determines that a threshold value has been exceeded, wherein the action comprises at least isolating a host system from the network during which the host system maintains an out-of-band (OOB) communications channel, as well as throttling of the network connection and the agent operates independently of the operating system so that the self-isolation functionality is available whether or not the operating system is loaded and whether or not the operating system is functional or compromised.

2. The method of claim 1, wherein generating an action comprises isolating a platform from the network.

3. The method of claim 1, wherein generating an action comprises sending an alert notification regarding the exceeded threshold value.

4. The method of claim 1, wherein monitoring network traffic comprises monitoring Internet Protocol (IP) packet headers.

5. The method of claim 1, wherein analyzing the network traffic using a heuristic comprises:
grouping destination IP addresses within a traffic window by destination port;
counting unique destination IP addresses for each of the ports; and
comparing the number of unique destination IP addresses for each of the destination ports against the threshold value for the traffic window.

6. The method of claim 1, wherein analyzing the network traffic using a heuristic comprises:
dividing the network traffic into Transmission Control Protocol (TCP) traffic and User Datagram Protocol (UDP) traffic; and
analyzing the TCP traffic and the UDP traffic separately according to the heuristic.

7. The method of claim 6, wherein analyzing the TCP traffic comprises:
grouping destination IP addresses within a traffic window by destination port;
counting unique destination IP addresses appearing in TCP synchronize (SYN) requests on each port for each traffic window; and
comparing the number of unique destination IP addresses against the threshold value for each traffic window on the destination port.

8. The method of claim 6, wherein analyzing the UDP traffic comprises:
grouping destination IP addresses within a traffic window by destination port;
counting unique destination IP addresses on each port for each traffic window; and
comparing the number of unique destination IP addresses against the threshold value for each traffic window on the destination port.

9. The method of claim 2, wherein isolating the platform from the network if the heuristic determines that a threshold value is exceeded comprises filtering packets to prevent packets sent by the platform from reaching the network.

10. A machine-readable storage medium that provides instructions, which when executed by a machine, cause said machine to:
filter network-bound traffic with an autonomous embedded agent;
copy packet headers of the network-bound traffic to a packet-header cache of an inline processing unit;
receive the copies of packet headers from the packet-header cache,
analyze the packet headers according to one or more multi-timescale heuristics, wherein each multi-timescale heuristic has a plurality of windows of different sizes and each window size has a respective threshold value and wherein at least one traffic window is used to run multiple different heuristics;
send filter rules to the inline processing unit; and
selectively invoke an action based on the analysis, wherein the action comprises at least isolating a host system from the network during which the host system maintains an out-of-band (OOB) communications channel, as well as throttling of the network connection and the agent operates independently of the operating system so that the self-isolation functionality is available whether or not the operating system is loaded and whether or not the operating system is functional or compromised.

11. The machine-readable storage medium of claim 10, wherein the packet headers are time-stamped.

12. The machine-readable storage medium of claim 10, further comprising instructions, which when executed by a machine, cause the machine to:
count unique destination IP addresses in the copied packet headers within a window; and
compare the number of unique destination IP addresses against the threshold value for the window.

13. The machine-readable storage medium of claim 12, further comprising instructions, which when executed by a machine, cause the machine to create filter rules when a threshold is exceeded.

14. The machine-readable storage medium of claim 10, comprising further instructions that cause a machine to:
group destination IP addresses by destination port;
count unique destination IP addresses in the copied packet headers on each port during a time window; and
compare the number of unique destination IP addresses for the destination port against the threshold value for the traffic window.

15. The machine-readable storage medium of claim 14, comprising further instructions that cause a machine to create filter rules when a threshold is exceeded.

16. The machine-readable storage medium of claim 10, comprising further instructions that cause a machine to:
divide the network traffic into Transmission Control Protocol (TCP) traffic and User Datagram Protocol (UDP) traffic; and
analyze the TCP traffic and the UDP traffic separately according to the one or more heuristics.

17. The machine-readable storage medium of claim 16, comprising further instructions that cause a machine to:

count unique destination IP addresses in the TCP traffic appearing in TCP synchronize (SYN) requests that correspond to a destination port for each window; and compare the number of unique destination IP addresses against the threshold value for each window on the destination port.

18. The machine-readable storage medium of claim 16, comprising further instructions that cause a machine to:

count unique destination IP addresses in the UDP traffic that correspond to a destination port for each window; and compare the number of unique destination IP addresses against the threshold value for the traffic window on the destination port.

19. The machine-readable storage medium of claim 12, comprising further instructions that cause a machine to generate a notification when a threshold is exceeded.

20. The machine-readable storage medium of claim 14, comprising further instructions that cause a machine to generate a notification when a threshold is exceeded.

* * * * *